United States Patent
Krebs et al.

(10) Patent No.: US 10,413,109 B2
(45) Date of Patent: Sep. 17, 2019

(54) FOOD PREPARATION APPLIANCE FOR STEAM COOKING AND FOOD PROCESSING

(71) Applicant: Spectrum Brands, Inc., Middleton, WI (US)

(72) Inventors: Joseph Valdon Krebs, Madison, WI (US); Rolando Antonio Cavazos, Middleton, WI (US); Anida C. Campbell, Madison, WI (US)

(73) Assignee: Spectrum Brands, Inc., Middleton, WI (US)

( * ) Notice: Subject to any disclaimer, the term of this patent is extended or adjusted under 35 U.S.C. 154(b) by 497 days.

(21) Appl. No.: 14/192,105

(22) Filed: Feb. 27, 2014

(65) Prior Publication Data

US 2014/0272059 A1    Sep. 18, 2014

Related U.S. Application Data

(60) Provisional application No. 61/780,257, filed on Mar. 13, 2013.

(51) Int. Cl.
| | |
|---|---|
| *A47J 27/04* | (2006.01) |
| *A47J 43/046* | (2006.01) |
| *A23L 5/10* | (2016.01) |

(52) U.S. Cl.
CPC .......... *A47J 27/04* (2013.01); *A23L 5/13* (2016.08); *A47J 43/046* (2013.01); *A47J 2027/043* (2013.01)

(58) Field of Classification Search
CPC .... A47J 27/04; A47J 2027/043; A23L 1/0121
See application file for complete search history.

(56) References Cited

U.S. PATENT DOCUMENTS 4,164,174 A * 8/1979 Wallsten ............... A47J 36/022
                                                    220/23.87
4,574,776 A   3/1986 Hidle
(Continued)

FOREIGN PATENT DOCUMENTS

EP      0184501 A1   6/1986
EP      0630201 B1   5/1997
(Continued)

OTHER PUBLICATIONS

European Search Report for Application No. 14157804, dated Jun. 10, 2014, 6 pages.

*Primary Examiner* — Steven N Leff
(74) *Attorney, Agent, or Firm* — Kagan Binder, PLLC

(57) ABSTRACT

In a food preparation appliance and method for preparing food, an outer bowl has a bottom and a peripheral sidewall. An inner bowl is disposed at least in part within the outer bowl in spaced relationship therewith such that a gap is defined between the inner and outer bowls. The inner bowl has an interior space in which food is contained. A steam generator is in fluid communication with the gap between the inner bowl and the outer bowl, and is operable to deliver steam into the gap between the inner bowl and the outer bowl. The inner bowl and the outer bowl are configured relative to each other to define a tortuous flow path for steam to flow from the gap between the inner and outer bowls into the interior space of the inner bowl.

7 Claims, 11 Drawing Sheets

(56) References Cited

U.S. PATENT DOCUMENTS

| | | | |
|---|---|---|---|
| 5,338,111 A | 8/1994 | Trocherie et al. |
| 5,544,573 A | 8/1996 | Gateaud |
| 5,845,991 A | 12/1998 | Sundquist |
| 5,852,968 A | 12/1998 | Sundquist |
| 6,000,651 A | 12/1999 | Zibret et al. |
| 6,089,746 A | 7/2000 | Martin |
| 6,299,085 B1 | 10/2001 | Ekstrom |
| 6,325,312 B1 | 12/2001 | Karkos, Jr. |
| 6,350,053 B1 | 2/2002 | Morin |
| 6,364,226 B1 | 4/2002 | Kubicko |
| 6,375,102 B1 | 4/2002 | Bouleau et al. |
| 6,397,735 B1 | 6/2002 | Wong |
| 6,474,578 B1 | 11/2002 | Gonneaud et al. |
| 6,505,545 B2 | 1/2003 | Kennedy et al. |
| 6,513,967 B2 | 2/2003 | Masip et al. |
| 6,523,993 B2 | 2/2003 | Williams et al. |
| 6,609,821 B2 | 8/2003 | Wulf et al. |
| 6,637,681 B1 | 10/2003 | Planca et al. |
| 6,640,694 B2 | 11/2003 | Brezovnik et al. |
| 6,655,265 B2 | 12/2003 | Pavlovic et al. |
| 6,669,124 B2 | 12/2003 | Lazzer et al. |
| 6,703,061 B2 | 3/2004 | Kennedy et al. |
| 6,715,706 B1 | 4/2004 | Planca et al. |
| 6,736,539 B2 | 5/2004 | Brezovnik et al. |
| 6,748,853 B1 | 6/2004 | Brady et al. |
| 6,761,326 B2 | 7/2004 | Astegno et al. |
| 6,814,321 B2 | 11/2004 | Schorn et al. |
| 6,889,924 B2 | 5/2005 | Pavlovic et al. |
| 6,907,819 B2 | 6/2005 | Kernan |
| 7,004,414 B2 | 2/2006 | Chen et al. |
| 7,018,091 B2 | 3/2006 | Arroubi et al. |
| 7,047,872 B2 | 5/2006 | Mulle |
| 7,069,839 B2 | 7/2006 | Kernan et al. |
| 7,328,864 B2 | 2/2008 | Narai et al. |
| 7,419,111 B2 | 9/2008 | Gursel |
| 7,461,804 B2 | 12/2008 | Walters |
| 7,520,453 B2 | 4/2009 | Clapp et al. |
| 7,617,664 B1 | 11/2009 | Fitzpatrick |
| 7,632,007 B2 | 12/2009 | Wulf et al. |
| 7,641,380 B2 | 1/2010 | Behar et al. |
| 7,681,817 B2 | 3/2010 | Orent |
| 7,685,935 B2 | 3/2010 | Obersteiner |
| 7,686,240 B2 | 3/2010 | Pryor et al. |
| 7,690,592 B2 | 4/2010 | Ferraby |
| 7,757,984 B2 | 7/2010 | Lin et al. |
| 7,878,701 B2 | 2/2011 | Stephens et al. |
| 8,122,820 B2 | 2/2012 | Conti et al. |
| 8,220,730 B2 | 7/2012 | Ferraby et al. |
| 2009/0084274 A1 | 4/2009 | Kovacic et al. |
| 2009/0095459 A1 | 4/2009 | Williams et al. |
| 2009/0186139 A1* | 7/2009 | Dragan ............... A23L 1/0121 426/510 |
| 2009/0314168 A1 | 12/2009 | Krasznai |
| 2010/0170404 A1 | 7/2010 | Hensel et al. |
| 2010/0219324 A1 | 9/2010 | Kolar et al. |
| 2011/0014342 A1 | 1/2011 | Picozza et al. |
| 2011/0049279 A1 | 3/2011 | Beber et al. |
| 2011/0139017 A1 | 6/2011 | Beber et al. |
| 2011/0174905 A1 | 7/2011 | Chan et al. |
| 2011/0180645 A1 | 7/2011 | Wanat et al. |
| 2011/0185920 A1 | 8/2011 | Oblak et al. |
| 2011/0265664 A1 | 11/2011 | Goncalves et al. |
| 2011/0265665 A1 | 11/2011 | Goncalves et al. |
| 2011/0265666 A1 | 11/2011 | Beber et al. |
| 2011/0283896 A1 | 11/2011 | Lam et al. |
| 2012/0213902 A1* | 8/2012 | Leung ............... A47J 27/04 426/510 |

FOREIGN PATENT DOCUMENTS

| | | |
|---|---|---|
| EP | 0757529 B1 | 6/2000 |
| EP | 1049397 A1 | 11/2000 |
| EP | 0812561 B1 | 4/2001 |
| EP | 1143839 A2 | 10/2001 |
| EP | 1472962 B1 | 6/2006 |
| EP | 1272080 B1 | 1/2007 |
| EP | 1616514 B1 | 10/2007 |
| EP | 2147624 A1 | 1/2010 |
| EP | 2371251 A1 | 10/2011 |
| GB | 113868 A | 3/1918 |
| WO | 9529614 A2 | 11/1995 |
| WO | 2004054418 A1 | 7/2004 |
| WO | 2008031708 A3 | 8/2008 |
| WO | 2008101148 A1 | 8/2008 |
| WO | 2008148152 A1 | 12/2008 |
| WO | 2010080310 A1 | 7/2010 |
| WO | 2012170821 A1 | 12/2012 |

* cited by examiner

FOOD PREPARATION APPLIANCE FOR STEAM COOKING AND FOOD PROCESSING

CROSS-REFERENCE TO RELATED APPLICATIONS

This application claims priority to provisional application Ser. No. 61/780,257, filed Mar. 13, 2013, the entire disclosure of which is incorporated herein.

FIELD

The field of the disclosure relates generally to food preparation appliances, more particularly to a steam cooker appliance, and even more particularly to a combination food processor and steam cooker appliance.

BACKGROUND

Food preparation appliances come in many different types and are used in numerous different ways to prepare food. For example, one common food preparation appliance is steamer, or steam cooker, in which food is cooked using high temperature steam. Commonly known steamers include a base, a water reservoir, a heater for heating the water to produce steam, and a closeable container in which the food is held during use. Steam is introduced into the container to heat the food. Once drawback of some steam cookers is that upon initially introducing steam into the container (with food therein), the cooler (e.g., room temperature) air in the container causes the steam to condense on the interior walls of the container, often resulting in excess moisture to build up in the container and on the ingredients. Accordingly, such devices typically require that the user drain excess liquid from the ingredients or move them to a separate container for processing, after being steamed. If the excess liquid is not drained, the processed ingredients can become soggy or otherwise have an undesirable consistency. To this end, some other steam cookers have containers in which the bottom is perforated (e.g., a steaming basket). As such, these steaming baskets do not allow a user to cook a meltable substance (e.g., chocolate or cheese) therein, because the substance will leak through the perforations in the basket as the substance melts.

Another common type of food appliance includes a food processing device, which is typically used to process food ingredients from one form to another. For example, such devices are known for use in mixing/blending, processing, mashing chopping, slicing, dicing, mincing, grating or cutting food ingredients. Many food processors are electrically powered device that include a base housing an electric drive motor, and a container seatable on the base and having one or more processing implements (e.g., a blade) disposed in the container and operatively connectable to the drive motor. In use of the food processor, the container is placed and secured on the base and food is loaded into the container. The food processor is activated by a user to operate the motor, which operatively drives the processing implement to work the food in the desired manner. In some instances, the lid of the jar is configured with a chute open to the interior of the container to allow the user to add ingredients during operation of the food processor.

While food processors may be used to process raw or uncooked foods, as well as cooked foods, food processors themselves are not used to cook the foods. As such, the user must remove uncooked food after processing and then subsequently cook the processed food (if cooking is desired), or food must be cooked outside of the container and then loaded into the container for processing.

There is a need, therefore, for a steam cooker that remedies the above drawbacks associated with conventional steam cookers, as well as for a food processor that allows for steam cooking in the container of the food processor without having to remove food from the container and without having to remove the container from the base of the appliance to drain liquid from the food.

SUMMARY

In one aspect, a food preparation appliance generally comprises an outer bowl having a bottom and a peripheral sidewall. An inner bowl is disposed at least in part within the outer bowl and has a bottom disposed at least in part in spaced relationship with the bottom of the outer bowl and a peripheral sidewall disposed at least in part in spaced relationship with the peripheral sidewall of the outer bowl such that a gap is defined between the inner and outer bowls. The inner bowl has an interior space in which food is loadable for preparation by the appliance. A steam generator is in fluid communication with the gap between the inner bowl and the outer bowl, and is operable to deliver steam into the gap between the inner bowl and the outer bowl. The inner bowl and the outer bowl are configured relative to each other to define a tortuous flow path for steam to flow from the gap between the inner and outer bowls into the interior space of the inner bowl.

In another aspect, a bowl for use with a food preparation appliance that is operable to steam cook food disposed in the appliance, generally comprises an outer bowl having a bottom and a peripheral sidewall. An inner bowl is disposed at least in part within the outer bowl and has a bottom disposed at least in part in spaced relationship with the bottom of the outer bowl and a peripheral sidewall disposed at least in part in spaced relationship with the peripheral sidewall of the outer bowl such that a gap is defined between the inner and outer bowls. The inner bowl has an interior space in which food is loadable for preparation by the appliance. The outer bowl has at least one opening therein in fluid communication with a steam generator to receive steam into the gap between the inner and outer bowls. The inner bowl has an opening therein in fluid communication with the gap between the inner and outer bowls to permit steam received in the gap to flow into the interior space of the inner bowl for steam cooking the food in the inner bowl.

In yet another aspect, a method of preparing food in a food preparation appliance generally comprises loading food to be prepared into the interior space of a bowl having an outer surface and an inner surface defining the interior space of the bowl. Steam is directed to flow over the outer surface of the bowl to increase the temperature of the interior space of the bowl. Subsequent to increasing the temperature of the interior of the bowl, steam is directed to flow into the interior space of the bowl.

DETAILED DESCRIPTION

Figure 1:
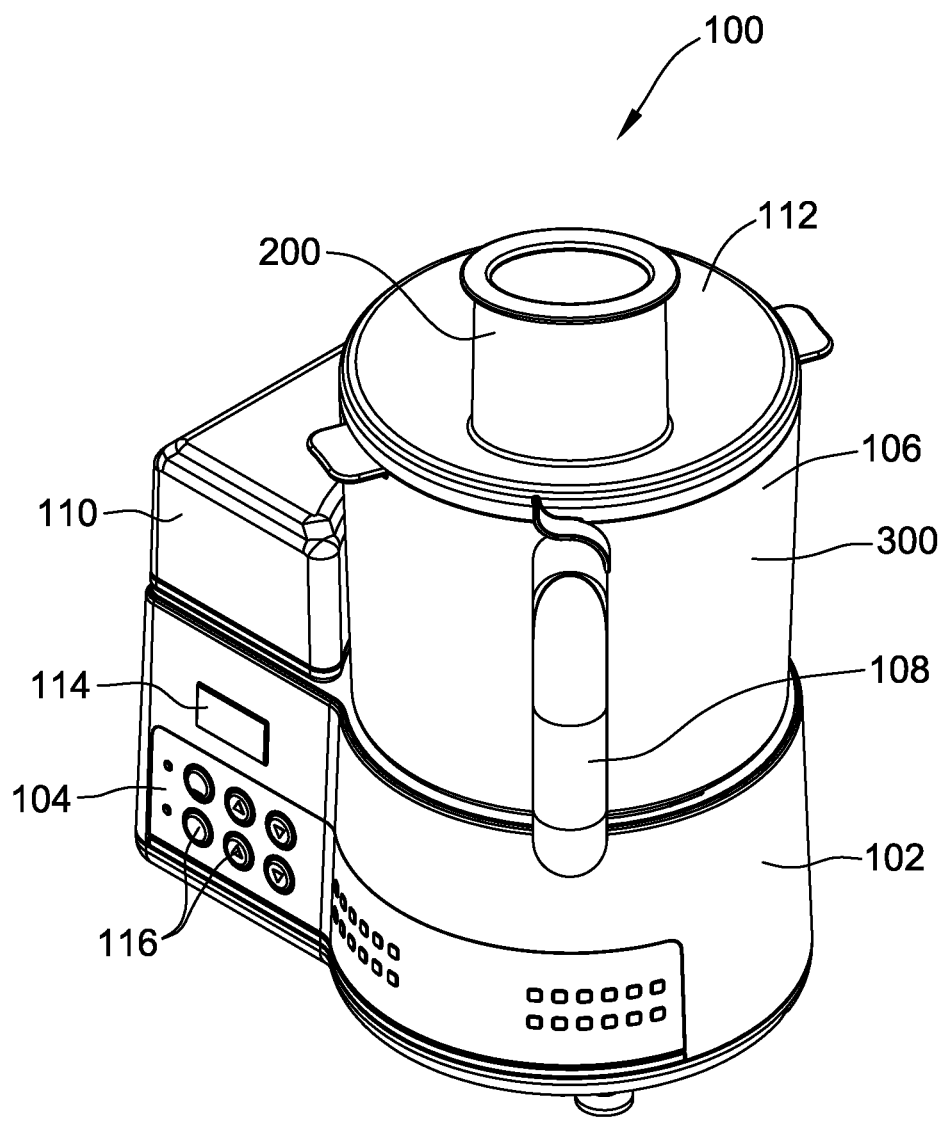
FIG. 1 is a perspective view of one embodiment of a food preparation appliance in the form of a combination food processor and steam cooker.

Referring now to the drawings, and in particular FIG. 1, one embodiment of a food preparation appliance is indicated generally at 100. The illustrated appliance 100 is in the form of a combination food processor and steam cooker. It is understood, however, that the appliance 100 may instead be solely in the form of a steam cooker and remain within the scope of this invention. It is also contemplated that the appliance 100 may be in the form of a steam cooker in combination with a food preparation device other than a food processor, or in addition to a food processor. The food preparation appliance 100 generally comprises a base 102 housing a drive motor (not shown) that includes a drive coupling (not shown) accessible from the top of the base. A suitable control panel 104 including a display 114 and operating switches 116 is disposed on the base 102 of the appliance 100 for operating the appliance. The appliance 100 further comprises a container 106 for containing food during processing and configured for seating on the base 102 in releasable interlocking or interconnecting engagement therewith. A handle 108 is provided on the illustrated container 106 for ease of gripping and manipulating the container.

Figure 2:
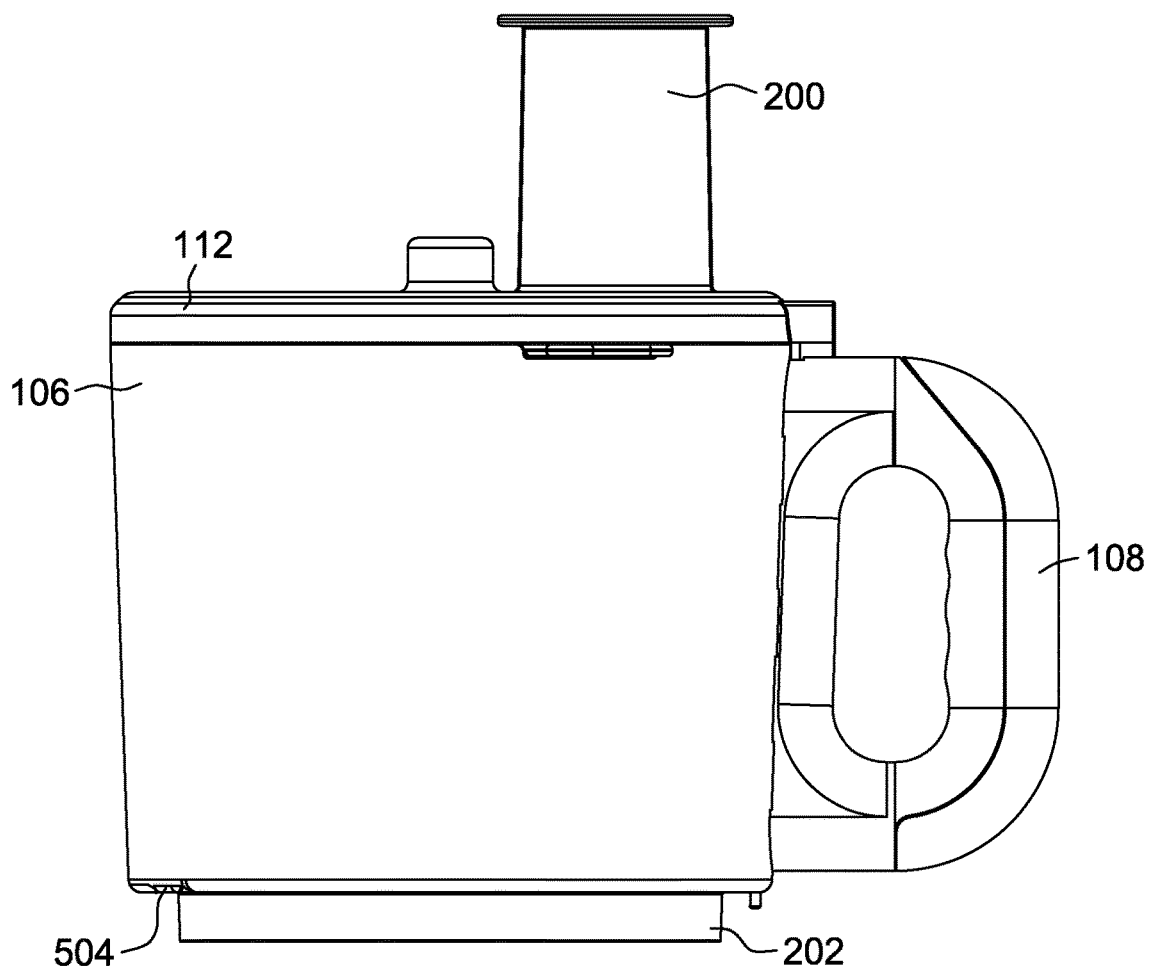
FIG. 2 is a side elevation of a container of the food preparation appliance of FIG. 1.

The illustrated appliance 100 also has a reservoir 110 for containing a liquid, e.g., water, and a heating device (not shown) for sufficiently heating the liquid to generate steam. A cover member 112 (e.g., a lid) is provided for the container to close the container 106 during operation. The cover member 112 is suitably releasably held on the container 106, such as in sealing engagement therewith, and includes a chute 200 open to the interior of the container for introducing ingredients into the interior of container while the cover member is on the container. In some embodiments, the container 106 and cover member 112 may include a safety device, such as a pressure activated switch (not shown) or the like, configured to prevent the drive motor in the base 102 from being activated unless the cover member is securely closed on the container. The container 106, as illustrated in FIG. 2, also includes an annular skirt 202 or other suitable alignment structure to facilitate alignment of the container on the base 102. For example, the base 102 may include a channel, or depression (not shown) corresponding to the skirt 202 allowing for a user to more readily place the container 106 on the base 102 in the proper position and allow for a more stable seating of the container on the base.

Figure 3:
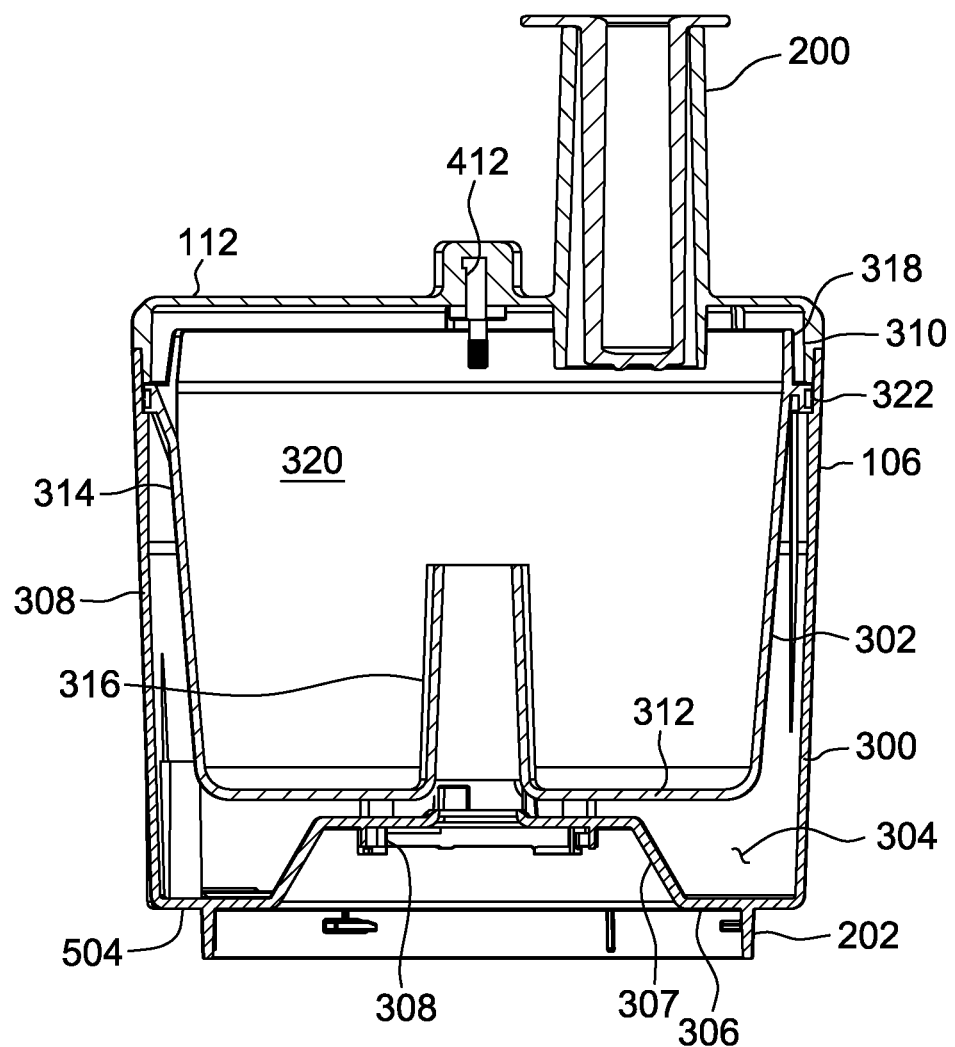
FIG. 3 is a vertical cross-section section of the container of FIG. 2, with a drive system and food processing implements of the appliance omitted.
Figure 4:
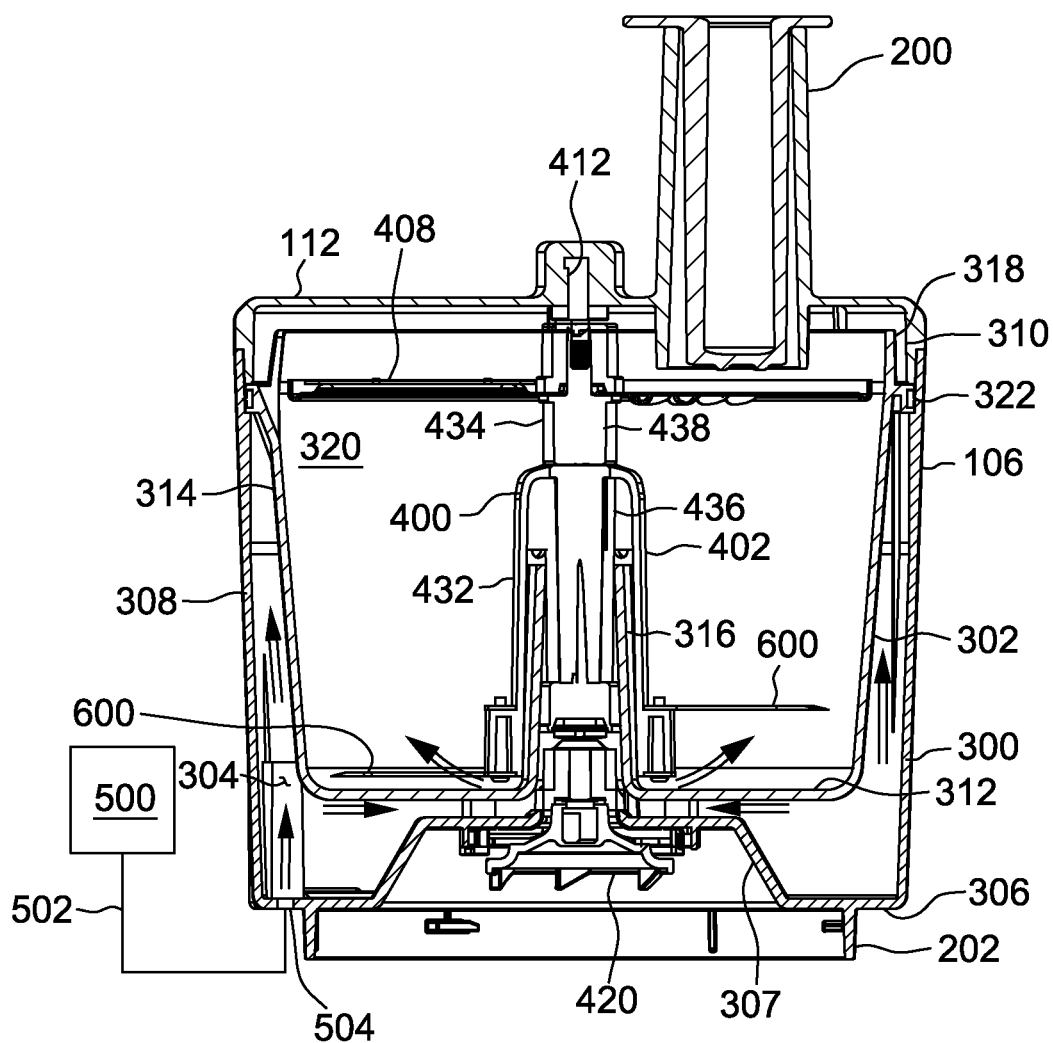
FIG. 4 is a vertical cross-section similar to FIG. 3 with the drive system and food processing implements assembled with the container, and with directional arrows indicating the flow of steam within the appliance.

With reference now to FIGS. 3 and 4, in one embodiment the container 106 generally comprises an outer bowl 300 and an inner bowl 302. The outer bowl 300 includes a bottom 306, the annular skirt 202 depending from the bottom of the outer bowl, and a peripheral sidewall 308 extending up from the bottom of the outer bowl. A central portion 307 of the bottom 306 of the outer bowl 300 is inset (e.g., raised in the embodiment of FIG. 3) to accommodate a suitable drive coupling 420 (e.g., as illustrated in FIG. 4) configured for driving connection with the drive coupling (not shown) of the drive motor (not shown) of the base 102. A central opening 309 is disposed in the central portion 307 of the bottom 306 of the outer bowl to allow extension therethrough of a suitable drive member 422 (FIG. 4) extending up from the drive coupling 420. As illustrated best in FIG. 9, the peripheral sidewall 308 of the outer bowl includes an upper rim 310 defining an opening to the interior of the outer bowl 300, and a shoulder 311 formed on the inner surface of the peripheral wall to support the inner bowl 302 within the outer bowl.

Referring back to FIGS. 3 and 4, the inner bowl 302 includes a bottom 312 configured and arranged for opposed relationship with the bottom 306 of the outer bowl 300, and a peripheral side wall 314 extending up from the bottom 312 and configured and arranged for opposed relationship with the peripheral side wall 308 of the outer bowl. The inner surface of the inner bowl 302 defines the interior of the container 106 in which food is processed (also broadly referred to as the food processing chamber). The inner bowl 302 is suitably sized in height and transverse cross-section (e.g., diameter) for at least partial insertion within the outer bowl 300. More suitably, the inner bowl 302 is sized in height and transverse cross-section for disposition within the outer bowl 300 such that at least the bottom 312 of the inner bowl is spaced from the bottom 306 of the outer bowl to define a gap 304 therebetween. In a more suitable embodiment, the peripheral side wall 314 of the inner bowl is also spaced from the peripheral side wall 308 of the outer bowl 300 so that the gap 304 further extends along at least a portion of the height of the outer bowl and more suitably along a substantial portion of the entire height of the outer bowl.

Figure 9:
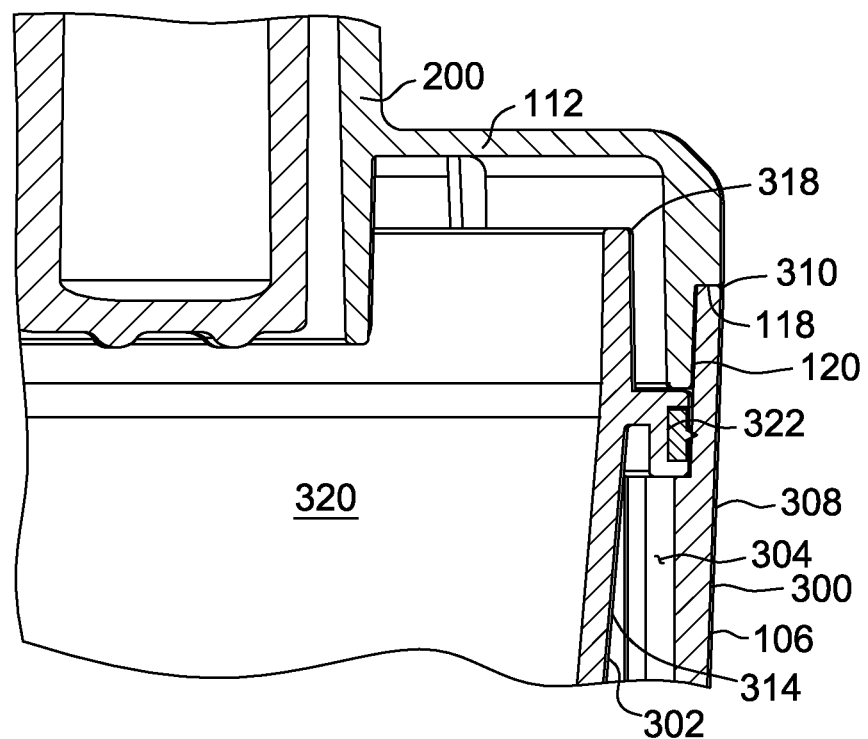
FIG. 9 is an expanded view of another portion of FIG. 4.

As illustrated best in FIG. 3, the inner bowl 302 further includes a central column 316 extending up from the bottom 312 of the inner bowl. The column 316 is open at both ends (one end being at the bottom 312) of the inner bowl 302) to accommodate a portion of the drive member 422 as well as a transmission member (FIGS. 4 and 5) that is operatively coupled to the drive member for driven rotation with the drive member in response to operation of the drive motor of the base 102. The peripheral side wall 314 of the inner bowl 302 has an upper rim 318 defining the interior 320 of the inner bowl and hence the interior (i.e., food processing chamber) of the container 106. As illustrated in FIG. 9, an annular flange 322 extends transversely outward from the outer surface of the peripheral sidewall 314 of the inner bowl 302 for seating on the shoulder 311 formed in the inner surface of the peripheral sidewall 308 of the outer bowl so that the inner bowl is releasably supported by the outer bowl with the desired gap 304 between the inner and outer bowls. Contact between the annular flange 322 of the inner bowl and the shoulder 311 of the outer bowl 300 also generally closes the gap 304 between the inner and outer bowls.

Still referring to FIG. 9, the cover member 112 is suitably configured to sealingly engage at least the outer bowl 300 to close the interior 320 of the container 106 during operation of the appliance 100. For example, the illustrated cover member 112 has a shoulder 118 configured for seating on the upper rim 310 of the outer bowl. A terminal segment 120 of the cover member extends downward from the shoulder for at least closely spaced relationship with the inner surface of the outer bowl adjacent the upper rim 310, and more suitably close contact relationship with the inner surface of the outer bowl adjacent the upper rim as illustrated in FIG. 9. While shown in the illustrated embodiments, a suitable sealing member (e.g., in the form of an O-ring, gasket or other suitable sealing member, may be used to further seal the cover member 112 on the outer bowl 300. It is also contemplated that the cover member 112 may alternatively, or additionally, contact and in some embodiments seal against the inner bowl 302 without departing from the scope of this invention. The chute 200 extends through the cover member 112, thus allowing objects or ingredients to be inserted into the food processing chamber 320 without removing the cover member 112.

With particular reference to FIGS. 4-8, the drive member 422 extends vertically up from the drive coupling 420 and includes an annular shoulder 424. The transmission member 406 is generally tubular, having an inner channel 426 configured to receive the drive member 422 therein. A base 428 of the transmission member 406 seats on the annular shoulder 424 to limit the extension of the drive member 422 into the inner channel 426 of the transmission member. The transverse cross-section of the inner channel 426 is keyed to the transverse cross-section of the drive member 422 above the shoulder 424 to drivingly connect the transmission member 406 to the drive member for conjoint rotation therewith upon operation of the drive motor of the appliance 100. The base 428 of the transmission member defines a shoulder 430 the purpose of which is described later herein.

With continued reference to FIGS. 4-7, a food processing implement 400 is disposed within the inner bowl 302 of the container 106 and operatively connected to the transmission member 406—and hence the drive motor—for rotation relative to the container. More particularly, the illustrated food processing implement 400 has an elongate hub 402 that is generally hollow along its length and has a sidewall 432 sized in transverse cross-section for seating over and thus surrounding the central column 316 extending up from the bottom 312 of the inner bowl as seen best in FIGS. 4 and 5. In the illustrated embodiment, the food processing implement 400 is in the form of a cutting implement having one or more blade elements 600 extending transversely outward from the lower region of the hub 402 of the implement. It is understood that the implement 400 may have any number of blades 600, and that the blades may be of any suitable configuration, without departing from within the scope of this invention. It is also understood that the implement 400 may be configured other than for cutting. For example, the food processing implement 400 may be a grater, shredder, kneader, strainer or the like.

An elongate drive shaft 434 is formed integrally with the illustrated hub 402 and includes a lower segment 436 extending axially within the hub and an upper segment extending axially upward of the hub. The lower segment 436 has a sidewall 440 defining an inner channel 442 configured for receiving the transmission member 406 therein. The transverse cross-section of the inner channel 442 of the drive shaft lower segment 436 is keyed to the transverse cross-section of the transmission member 406 to thereby operatively connect the hub 402 to the transmission member for driven rotation of the hub conjointly with the drive motor in the appliance base 102. The lower end of the lower segment 436 seats on the shoulder 430 of the transmission member 406 to axially position the hub 402 relative to the inner bowl 302 of the container 106.

In the illustrated embodiment, the sidewall 440 of the lower segment 436 of the drive shaft 434 is transversely spaced from the sidewall 432 of the hub 402 to accommodate the column 316 therebetween. More particularly, as seen best in FIG. 5, the spacing therebetween is such that the sidewall 440 of the lower segment 436 of the drive shaft 434 is transversely spaced from the column 316 and the sidewall 432 of the hub 402 is transversely spaced from the column 316 to define a continuous flow path for steam flowing from the interior to the exterior of the hub as described later herein.

Figure 10:
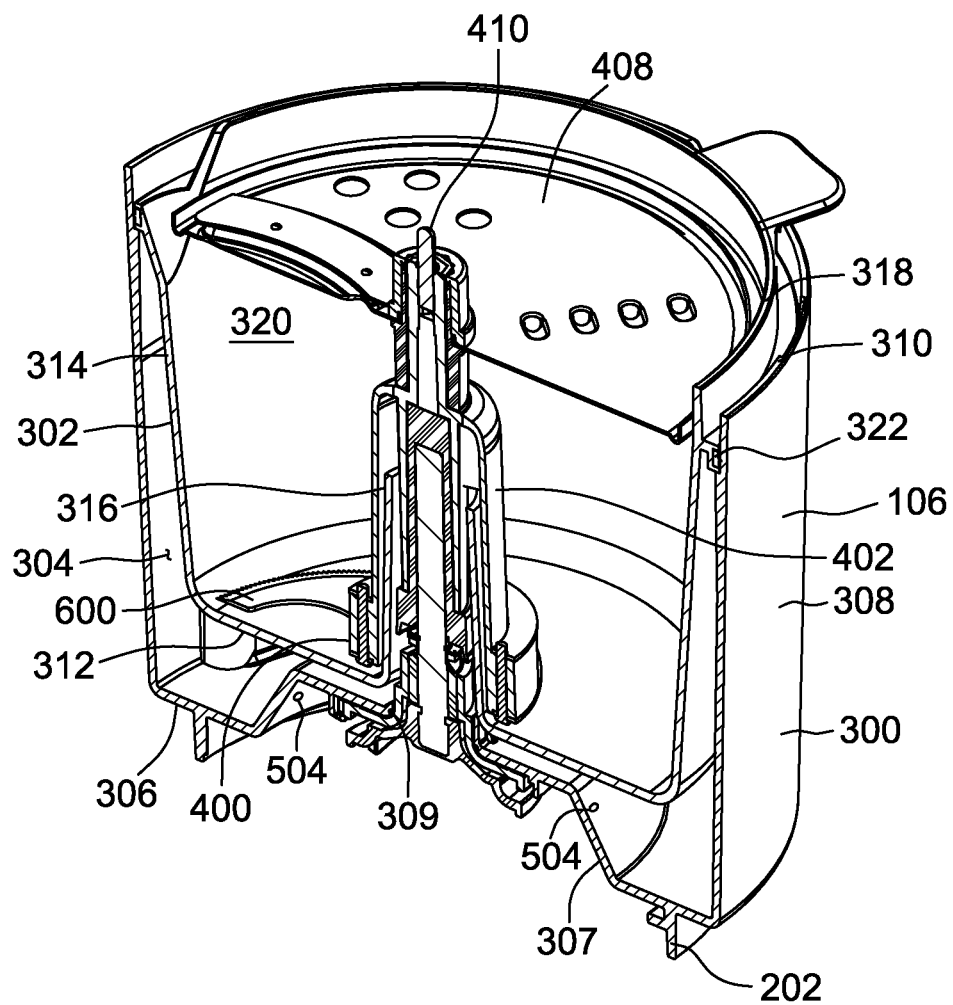
FIG. 10 is a perspective vertical cross-section of the container of FIG. 2 with the lid removed.
Figure 11:
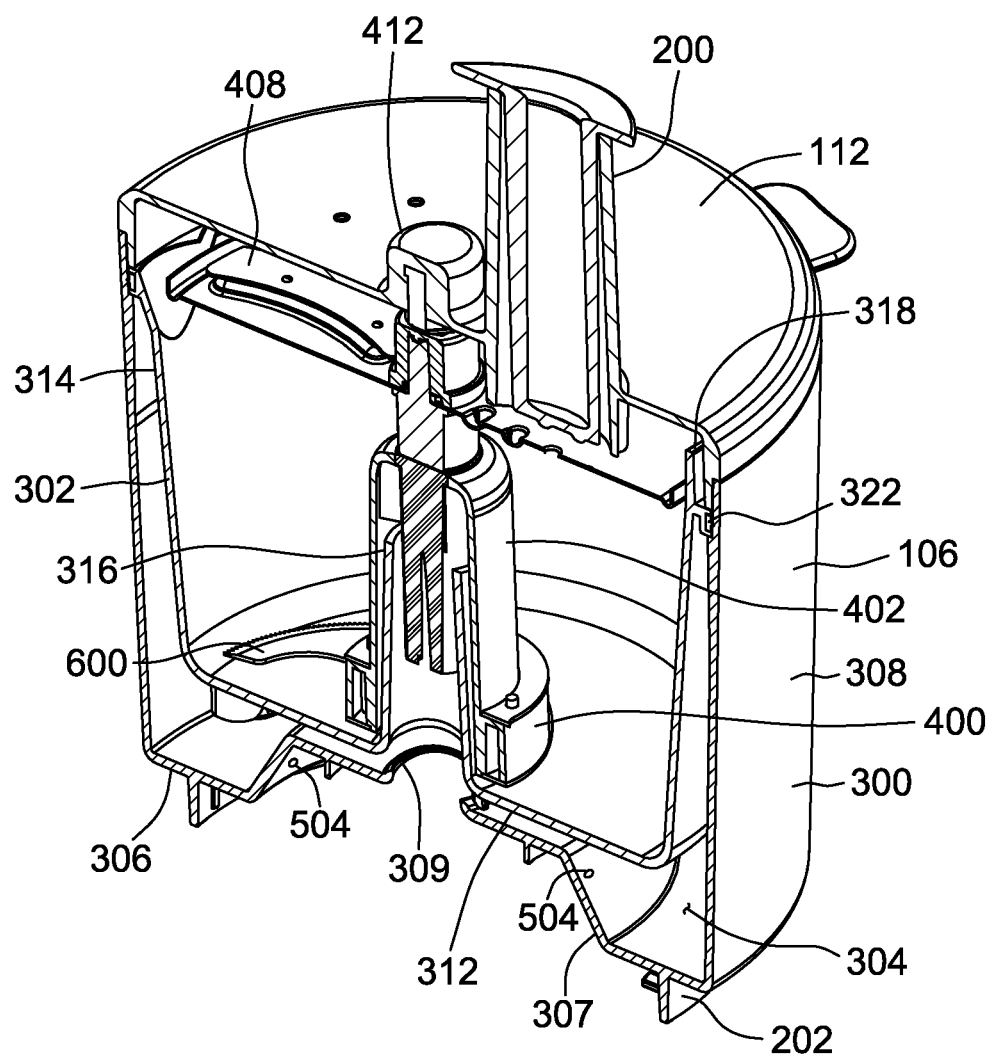
FIG. 11 is a perspective similar to FIG. 10 but with the lid in place.

In the illustrated embodiment, a second food processing implement 408 is operatively connected to the upper segment 438 of the drive shaft 434 (e.g., in axially spaced relationship with the food processing implement 400) for conjoint rotation with the drive shaft and hence the other food processing implement. This second food processing implement 408 may be positioned closer to the upper rim 318 of the inner bowl 302 than the food processing implement 400, and may be the same type of food processing implement as the food processing implement 400, or a different type. For example the illustrated second food processing implement 408 is a slicing type of food processing implement. Also best illustrated in FIGS. 10 and 11, an alignment pin 410 seats within the upper end of the drive 434 and extends axially into a seat 412 formed in the cover member 112 to facilitate and maintain axial alignment of the drive shaft (and hence the food processing implements 400, 408) in the container 106.

Operation of the appliance 100 will now be described with particular reference to FIGS. 4 and 5. Initially, a user inserts one or more ingredients (not shown), such as food ingredients, into the interior space (i.e., the food processing chamber) 320 of the container (e.g., as defined by the interior space of the inner bowl 302). The food ingredients typically rest on the bottom 312 of the inner bowl 302. At this time, the user may begin a steam cooking operation by accessing the control panel 104 (FIG. 1), such as by using the one or more buttons or switches 116, to initiate a steaming operation. Once the steaming operation is initiated, a steam generating device 500 (e.g., heating device) within the base 102 is activated to generate steam from the liquid (e.g., water) disposed in the reservoir 110. In other suitable embodiments, the heating device 500 may be disposed in whole or in part in the reservoir 110. The generated steam is directed into the container 106 by way of a suitable conduit 502. More particularly, in the illustrated embodiment of FIG. 4 steam is delivered by the conduit to an opening 504 in the bottom 306 of the outer bowl 300 transversely exterior of the annular skirt 202 for flowing into the gap 304 between the outer bowl 300 and the inner bowl 302. In other embodiments, there may be more than opening 504 in the bottom 306 of the outer bowl 300 through which steam is delivered into the gap 304 between the outer and inner bowls 300, 302.

Initially, the surfaces of the outer and inner bowls 300, 302 are cooler than the entering steam due to the cooler air temperature (e.g., room temperature) in the gap 304 and the interior space 320 of the inner bowl—as well as the temperature of the food in the container 106. This causes condensation of the steam within the gap 304 until the temperature in the interior space 320 of the inner bowl heats up to a temperature closer to that of the steam in the gap between the bowls 300, 302. The steam that has condensed within the gap 304 collects at the bottom 308 of the outer bowl 300 rather than within the interior space 320 of the inner bowl 302 where the food is contained. In this manner, a majority of condensation collects in the outer bowl 300 during operation, instead of in the inner bowl 302.

Figure 5:
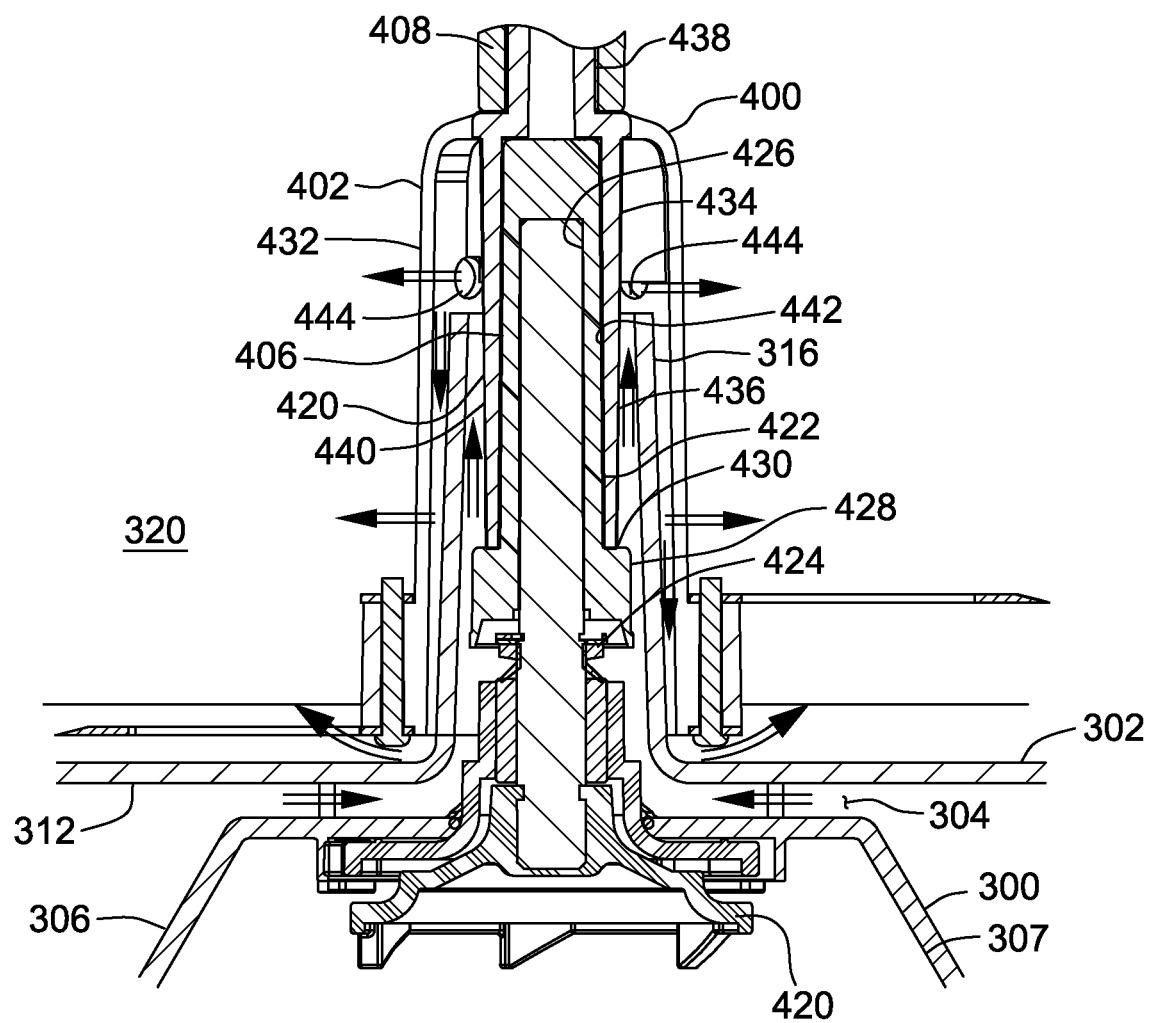
FIG. 5 is an expanded view of a portion of FIG. 4.
Figure 6:
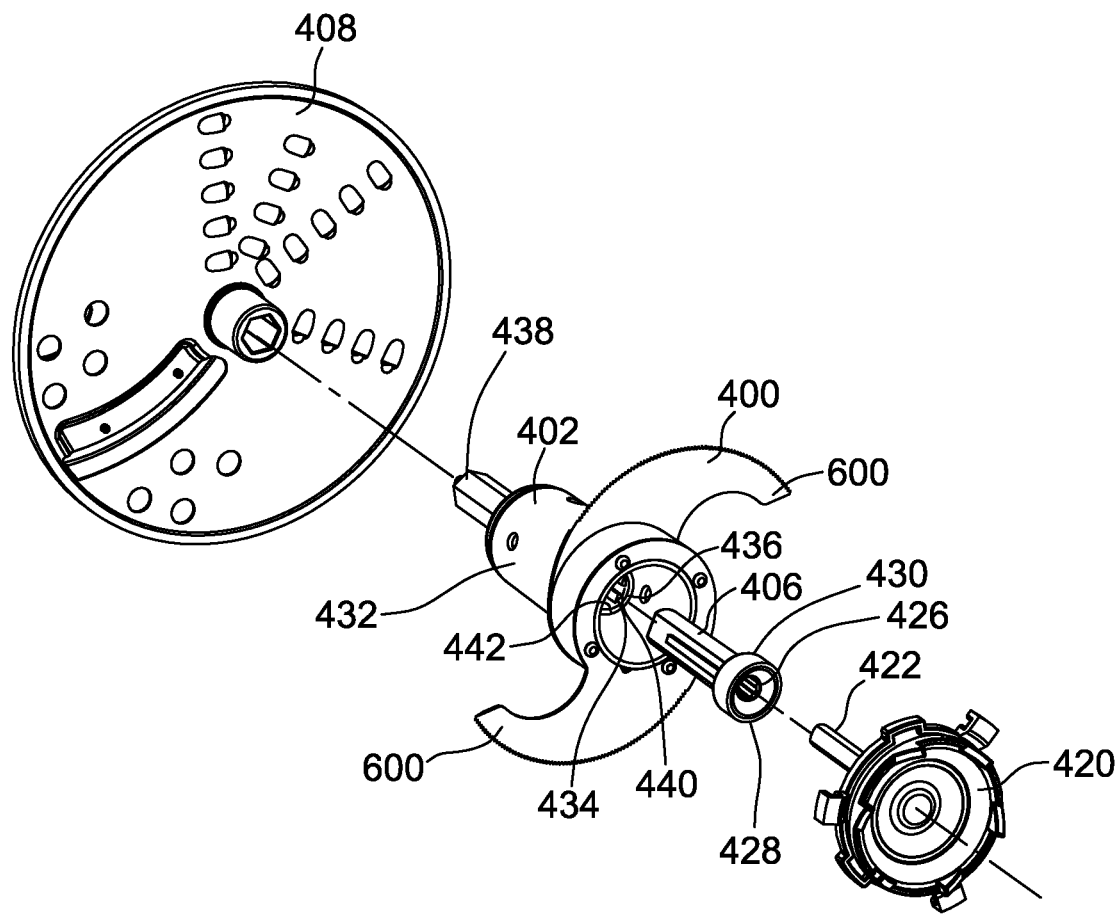
FIG. 6 is an exploded perspective view of the drive system and food processing implements of the appliance of FIG. 4.
Figure 7:
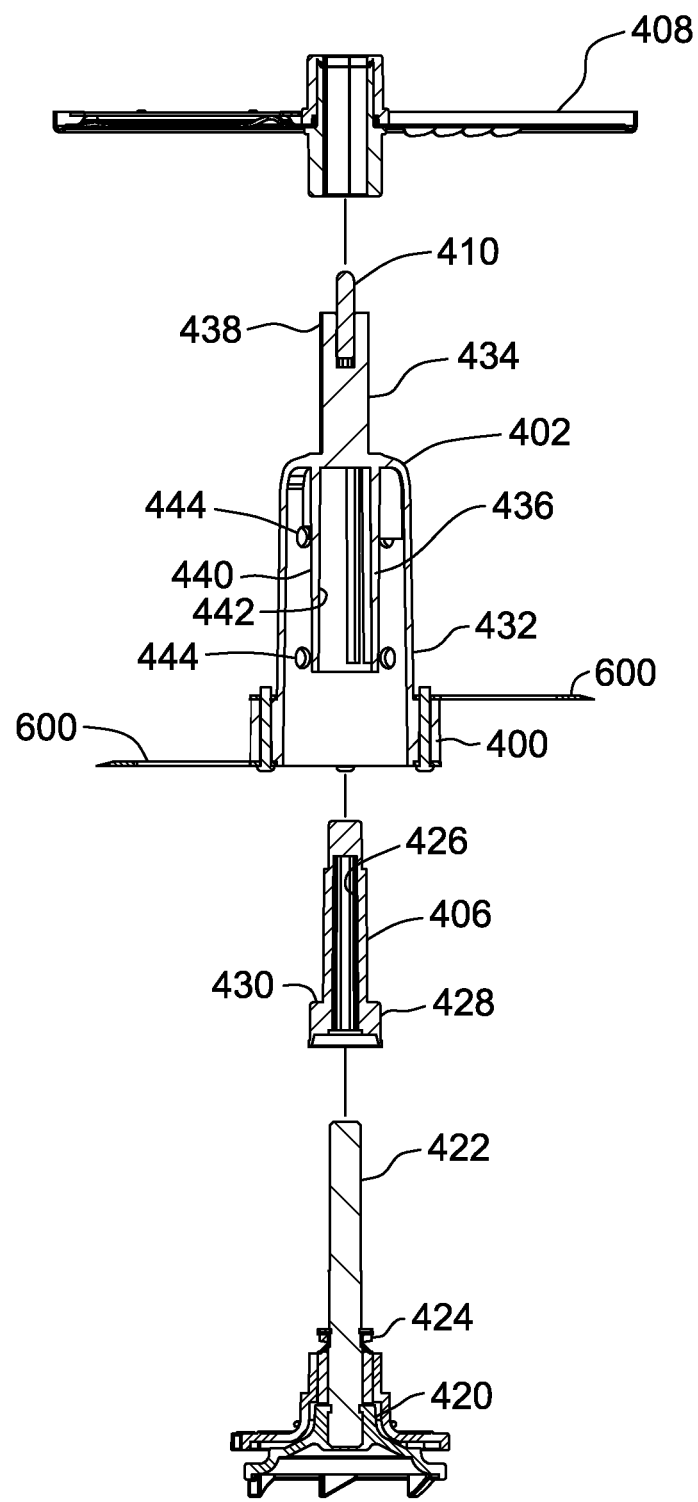
FIG. 7 is an exploded side elevation of the drive system and food processing implements.
Figure 8:
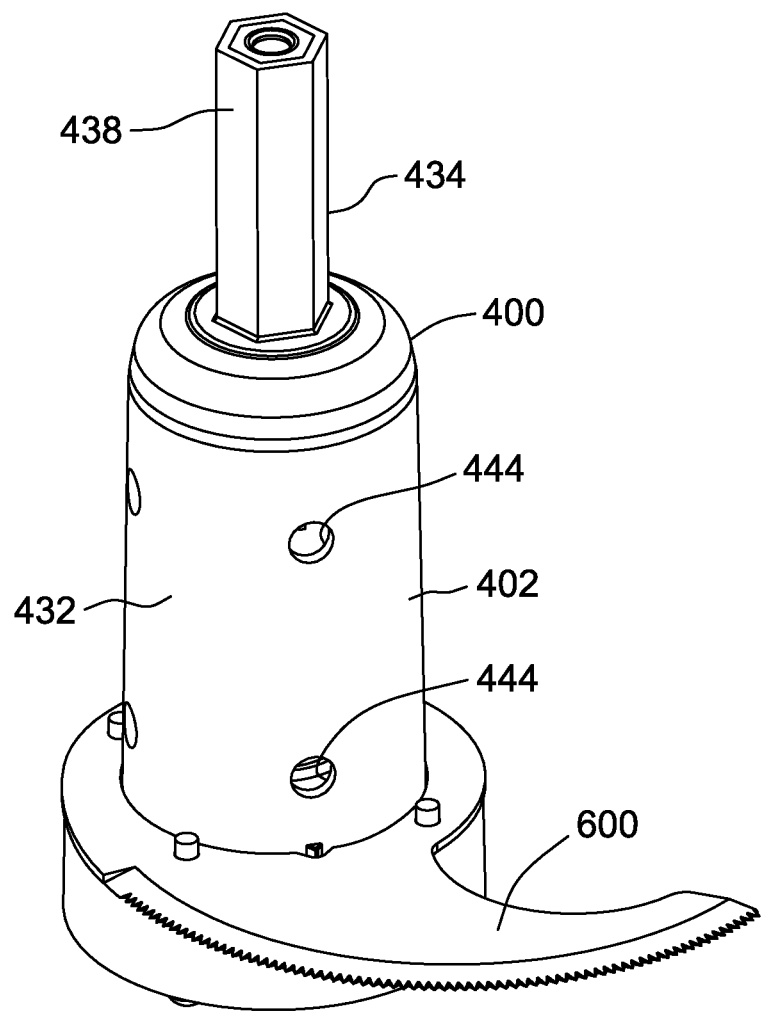
FIG. 8 is a perspective of the drive system and food processing implements fully assembled.

As the inner bowl 302 is heated by the steam, the steam begins to travel upward through the flow path defined between the lower segment 436 of the drive shaft 434 and the central column 316, and between the central column and the hub 402 as illustrated in FIG. 5. This flow path is also broadly referred to herein as a second steam supply conduit. The steam then flows into the interior space 320 of the inner bowl 302 to fill the volume where the food is thus subjected to the steam. In the illustrated embodiment, the sidewall 432 of the hub 402 also includes holes 444 therein to allow steam flowing along the flow path between the column 316 and the hub 402 to flow into the interior space 320 of the inner bowl 302. The cover member 112 is configured to allow excess steam to vent therefrom, for example through the chute 200 to prevent excess pressure buildup.

During steaming, the control panel 104 may display an elapsed time, or time remaining, for the steaming operation on the display 114. At a desired time, or predetermined time set by the control system, the steam generating unit may be deactivated such that steam is no longer produced. For example, in one embodiment, the control panel 104 may be configured to activate the steam generating unit for 30 minutes, and then deactivate. However, in other embodiments the control panel 104 may be configured to allow a user to set a desired amount of activation time, or manually activate and deactivate the steam generating unit, for example once the user determines that the food ingredients have been sufficiently cooked.

Without being bound to a particular theory, it is believed that because the steam initially warms the inner bowl 302 before the steam enters the interior space 320 of the inner bowl 302, a reduction in the amount of condensation occurs within the interior space where the food is processed and cooked. Rather, the majority of steam accumulates in the outer bowl 300, i.e., outside the food processing chamber. Accordingly, the ingredients do not need to be drained or transferred to a separate container for processing and instead the steam-cooked food can be processed right away. It is also noted that the inner bowl 302 allows for the possibility that a user may cook a meltable substance such as chocolate or cheese therein. Because the bottom 312 of the inner bowl 302 has no drain openings, the melted substance remains in the inner bowl after being melted.

Once the food ingredients have been steam cooked, they may be removed from the container 106 without further processing. In this manner, the appliance 100 may be utilized solely as a steam cooker. However, the user may desire to process the ingredients after they have been steam cooked, for example to produce a smooth textured food product, such as baby food or the like. Thus, subsequent to the steaming operation, the appliance 100 may be configured to automatically, or manually activate a processing operation. For example, the control panel 104 may be accessed to select a button or switch 116 to activate the drive motor in the base 102 to drive rotation of the food processing implement(s) 400 and/or 408. In another implementation, the control system may automatically initiate activation of the drive motor upon deactivation of the steam generator. As the food processing implement(s) 400 and/or 408 rotate, the food ingredients within the interior space 320 of the inner bowl 302 are processed. The control system may be configured to process the food ingredients for a predetermined amount of time, or the user may manually pulse the activation of the drive system by pressing a corresponding button or switch 116 on the control panel 104.

In other embodiments, the user may desire to process the ingredients before activating the steaming operation. In such embodiments, the control panel 104 may be configured to allow the user to first activate the drive motor to process the ingredients using the food processing implement 400 and/or 408, before activating the steaming operation. In yet other embodiments, the food processing operation and the steaming operation may be activated to occur simultaneously.

It should be appreciated that the control panel 104 is part of the control system and may include one or more processors and computer readable memory. The methods described herein may be encoded as executable instructions embodied in a computer readable memory, including, without limitation, a storage device or a memory area of the control system. Such instructions, when executed by one or more processors, cause the processor(s) to perform at least a portion of the methods described herein, such as activating the drive system and or the steam generating unit.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A food preparation appliance comprising:
an outer bowl having a bottom and a peripheral sidewall extending to surround the bottom;
an inner bowl disposed at least in part within the outer bowl and having a bottom disposed at least in part in spaced relationship with the bottom of the outer bowl and a peripheral sidewall surrounding the bottom of the inner bowl and disposed at least in part in spaced relationship with the peripheral sidewall of the outer bowl such that a gap is defined between the inner and outer bowls between the inner and outer bottoms and the inner and outer peripheral walls to create a portion of a flow path, the inner bowl having an opening in the bottom thereof that leads into a tubular column extending within an interior space of the inner bowl and within which food is loadable for preparation by the appliance; and
a steam generator in fluid communication with the gap between the inner bowl and the outer bowl, the steam generator being operable to deliver steam into the gap between the inner bowl and the outer bowl so that steam flows along the flow path including along an outer surface of the peripheral sidewall of the inner bowl and an outer surface of the bottom of the inner bowl and from there into the tubular column for heating the inner bowl and delivering steam into the inner bowl, the inner bowl and the outer bowl being configured relative to each other to define a tortuous flow path portion of the flow path for steam to flow from the gap between the inner and outer bowls, through the opening in the bottom of the inner bowl, through the tubular column and into the interior space of the inner bowl.

2. The appliance of claim 1 further comprising at least one food processing implement positioned within the interior space of the inner bowl and operable to be driven by a shaft extending within the tubular column so as to act on food disposed within the interior space of the inner bowl.

3. The appliance of claim 2 wherein the food processing implement is operable to act on food in the inner bowl concurrently with steam being delivered through the tubular column and to the interior space of the inner bowl.

4. The appliance of claim 2 wherein the appliance further comprises a drive motor, the at least one food processing implement comprising a hub operatively connected to the drive motor for driven rotation by the shaft, and at least one blade extending from the hub into the interior space of the inner bowl for conjoint rotation with the hub to act on food disposed in the inner bowl.

5. The appliance of claim 1 further comprising a generally inverted-cup-shaped hub provided as a part of a food processing implement and configured for disposition in the inner bowl over the column, the hub having a generally closed upper end and a depending peripheral sidewall in opposed relationship with the column, the hub being spaced from the column to further define the tortuous flow path for steam whereby steam in the gap between the inner and outer bowls must flow through the opening in the bottom, then flow in a first direction through the column and then flow between the peripheral sidewall of the hub and the column in a second direction different from the first direction to flow into the interior space of the inner bowl.

6. The appliance of claim 1 wherein the column has an inner surface and an outer surface, the appliance further comprising a food processing implement positioned within the interior space of the inner bowl and operable to act on food disposed within the interior space of the inner bowl, the food processing implement comprising at least the hub, the appliance further comprising a drive motor and a drive system disposed at least in part within the column extending from the bottom of the inner bowl and being operatively connected to the drive motor through the opening in the bottom of the inner bowl for operation of the implement, the drive system being at least in part spaced from the column to further define the tortuous flow path for steam whereby steam in the gap between the inner and outer bowls must flow through the opening in the bottom of the inner bowl, then flow in a first direction between the drive system and the inner surface of the column and then flow between the peripheral sidewall of the hub and the outer surface of the column in a second direction different from the first direction to flow into the interior space of the inner bowl.

7. The appliance of claim 1 wherein the inner and outer bowls are configured relative to each other to close the gap therebetween at a location other than along the bottom of the outer bowl to substantially inhibit steam within the gap between the inner and outer bowls from exiting the appliance without first passing through the interior space of the inner bowl.

* * * * *